United States Patent
Inbar et al.

(10) Patent No.: US 10,838,644 B2
(45) Date of Patent: Nov. 17, 2020

(54) DATA STORAGE ARRANGEMENT PARTITIONABLE MEMORY AND METHOD TO ACCOMPLISH PARTITION

(71) Applicant: Western Digital Technologies, Inc., San Jose, CA (US)

(72) Inventors: Karin Inbar, Ramat Hasharon (IL); Avichay Hodes, Kfar Ben-Nun (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 58 days.

(21) Appl. No.: 15/833,338

(22) Filed: Dec. 6, 2017

(65) Prior Publication Data

US 2019/0171384 A1    Jun. 6, 2019

(51) Int. Cl.
*G06F 3/06*   (2006.01)
*G06F 11/30*  (2006.01)

(52) U.S. Cl.
CPC .......... *G06F 3/0644* (2013.01); *G06F 3/0631* (2013.01); *G06F 3/0679* (2013.01); *G06F 11/3034* (2013.01)

(58) Field of Classification Search
None
See application file for complete search history.

(56) References Cited

U.S. PATENT DOCUMENTS

| | | | |
|---|---|---|---|
| 2011/0271043 A1* | 11/2011 | Segal | G06F 12/0246 711/103 |
| 2013/0067138 A1* | 3/2013 | Schuette | G06F 3/0616 711/103 |
| 2015/0301754 A1* | 10/2015 | Kochar | G06F 3/0679 711/103 |
| 2016/0357632 A1* | 12/2016 | d'Abreu | G06F 11/1072 |
| 2017/0285954 A1* | 10/2017 | Fan | G06F 3/0604 |
| 2018/0081594 A1* | 3/2018 | Jung | G11C 7/1084 |

* cited by examiner

*Primary Examiner* — Charles Rones
*Assistant Examiner* — Ryan Dare
(74) *Attorney, Agent, or Firm* — Patterson & Sheridan, LLP; Steven H. Versteeg

(57) ABSTRACT

A method for augmenting a computing device is disclosed comprising providing a data storage arrangement, the data storage arrangement having a memory having a partition of a first section and a sub dividable second section, monitoring the computing device to determine when the first section of memory requires augmentation, subdividing the second section of the memory into a transferable section memory and a remainder section memory and augmenting the first section of the memory with the transferable section.

9 Claims, 3 Drawing Sheets

DATA STORAGE ARRANGEMENT PARTITIONABLE MEMORY AND METHOD TO ACCOMPLISH PARTITION

FIELD OF THE DISCLOSURE

Aspects of the disclosure relate to computer storage. More specifically, aspects of the disclosure relate to augmenting single level cell provisions within a computer storage unit with data storage from other computer storage sections to create a temporary triple level cell/single level cell hybrid partition extension.

BACKGROUND INFORMATION

Computer storage needs have grown for computer applications over the years. As time has progressed, computer manufacturers have become more efficient in production of computers, and also in increasing the longevity of the computers that are produced. As the average life-cycle of a typical computer has increased dramatically over recent years, these computers encounter problems that have not been fully expected or explored.

Computer component manufacturers have been continually pressured by computer manufacturers to increase the features of their components as well as the expected life cycle of those components. While some component manufacturers can easily meet the new standards from computer manufacturers, some component manufacturers are more pressured as the components that are produced have moving parts that wear out or have material science limitations.

One set of component manufacturers that are challenged by the new expected life cycles for computers are data storage manufacturers. Data storage manufacturers can run into material science limitations in the design of their devices. As a computer lifecycle progresses, users will continually access the data storage of the computer. The continual use of the user necessitates programming/writing/erasing of the data storage devices attached to the computer. Each of the data storage devices has a finite life and a specific number of writing and erasing that can occur in a safe manner. Usage beyond the manufacturer tight specifications can lead to errors as the memory units may no longer have the capability of storage of information.

Computer errors can be detected by software algorithms, extending the life of the data storage devices. Software algorithms, however, do have limitations and as ever increasing material science errors occur in a device over time, computer crashes and inoperability can occur. Conventional methods and arrangements are limited in their ability to provide extended lifecycle capabilities.

There is a further need to allow for monitoring of computer storage over time to ensure that deficiencies in computer storage do not impact user requirements.

There is need to provide computer storage that is economical for users over a lifetime of use.

There is a further need to provide for augmentation of computer storage over time to allow for aging and use of storage within manufacturer guidelines.

SUMMARY

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

In a first non-limiting embodiment, a method for augmenting a computing device is disclosed comprising providing a data storage arrangement, the data storage arrangement having a memory having a partition of a first section and a sub dividable second section, monitoring the computing device to determine when the first section of memory requires augmentation, subdividing the second section of the memory into a transferable section memory and a remainder section memory and augmenting the first section of the memory with the transferable section.

In a second non-limiting embodiment, an arrangement is disclosed comprising means for monitoring a computing device to determine when a first section of memory requires augmentation, means for subdividing a second section of a storage device memory into a transferable section memory and a remainder section memory and means for augmenting the first section of the memory with the transferable section memory.

In a further example embodiment, an arrangement is disclosed comprising a flash memory comprising a first section composed of single level cell arrangements and a second section composed to triple level cell arrangements and a controller configured to monitor storage activities in the first section of the flash memory and further configured to subdivide the second section of the flash memory to create a transferable memory section and a remainder memory section from the second section of the flash memory, the controller further configured to use the transferable memory section as an extension of the first section.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
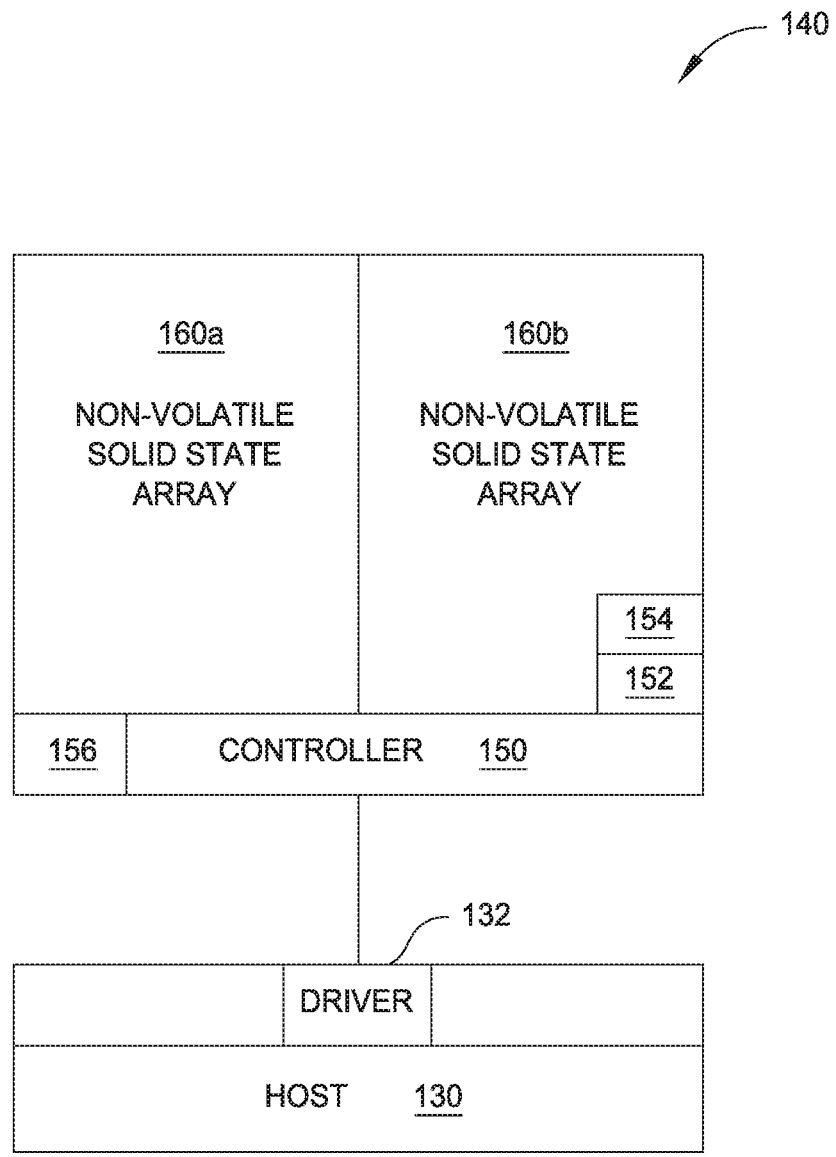
FIG. 1 is a plan view of a host-computer storage arrangement in accordance with one example embodiment of the description.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

Aspects of the present disclosure relate to computer operations and computer storage. In the embodiments described, a data storage arrangement is connected to a host system. The function of the data storage arrangement is accept data and store the data until needed again by a user or the host. The data storage arrangement may have to accept large bursts of data at a rapid pace, depending on the computer process performed, therefore the data storage arrangement is configured with multiple memory units that provide for various states of usage. Certain sections of the data storage arrangement are configured of memory systems that provide for fast action (low latency) so that computer processes may be conducted at a rapid pace. Such low latency action may be accomplished by single layer cell memory configurations. If bulk amounts of data are required to be stored, multiple layer cell memory configurations are also present, such as triple level cell memory configurations. The data storage arrangement may have an interface that allows the data storage arrangement to connect with the host. The interface may be a SATA compatible interface, as a non-limiting embodiment. The memory storage may have a configuration to allow for plug and play ability. Although described as having a SATA compatible interface, the memory storage device may be provided with a configuration which allows for access by wireless technology. In one non-limiting embodiment, 802.11ac technology may be used to provide for fast performance for smooth streaming. Wireless technology may use, for example, between 2.5 GHz to 5 GHz frequencies for connection. In some embodiments, the storage may allow users to choose the frequencies for wireless connection.

Auxiliary connections may be provided to the data storage arrangement to allow for addition options for inputting data directly to the data storage arrangement without interfacing with a host. Such direct input of data may be provided through placement of an integrated secure digital card to offload or copy data. Other auxiliary connections may be provided for additional input/output operations. Such connections may be USB 2.0, USB 3.0, Firewire or other hard wired configurations. Gigabit Ethernet interfaces and connections may also be used.

The data storage arrangement may be configured with a separate power supply or may be run through other power supply means, such as from a computer mother board. In some embodiments, an internal battery may be provided to power the data storage arrangement as an independent entity. Such configurations may be provided such that the data storage arrangement is a portable unit. In such data storage arrangement configurations, the power supply means may be sufficient to power a host and/or charge a host, such as a mobile cellular phone, personal computer, tablet, camera or other configuration. The data storage arrangement may also have a battery indicator to allow a user to understand the amount of charge in the data storage arrangement from a visual inspection. Such battery indicators may be, for example, low energy consumption light emitting diode technology. In specific embodiments, the data storage arrangement may be provided with a circuit to allow for charging and prevent overcharging of the system if the data storage arrangement is connected to an outside power supply for an extended period. In some embodiments, circuitry may be used to determine if a threshold of inactivity has been reached for the storage system, thereby causing the system to enter a low power consumption mode, conserving battery power.

A controller is provided to control actions of the data storage arrangement as required by the host. The controller may also be configured to perform maintenance activities for the data storage arrangement to allow for efficient use.

Internal software may be provided on the data storage arrangement to allow for efficient storage and read capability of data on the system. Such internal software may be used such that the data storage arrangement can be used as a portable media server to wirelessly stream media to a host or output device. Such output devices may include, but not be limited to, smart televisions, smart phones, stereo audio system. The internal software may also be provided such that the access of data may be performed by cloud applications designed for interface with the data storage arrangement.

The internal software of the data storage arrangement may also be configured to provide for security of the data storage arrangement. Safeguarding of material provided on the data storage arrangement prevents unauthorized access to sensitive information contained on the system. Such security may be in the form of password protection, such as a Wi-Fi password protection. In some embodiments, the data storage arrangement may be configured with software that allows the data storage arrangement to create a hardware lock. Such hardware locks may prevent access through a USB connection.

The internal software may also be capable of providing diagnostic support for users. In such configurations, two different modes may be provided. A quick test software program may be provided with the capability to check the data storage arrangement for major performance problems. A full test mode may also be provided to provide detailed status information to a user. Such status information may be, for example, total amount of memory of the data storage arrangement, the amount of memory storage used, storage divisions provided on the data storage arrangement, firmware versions for the internal software, memory block errors and similar data. The internal software may also have the capability of accepting data to update the firmware of the internal software.

The internal software may also be used as a server system wherein in certain embodiments, DLNA enabled software is incorporated. Such software allows for quick file transfer and error checked operation as a server. In some embodiments, the internal software may be provided with the capability to use file transfer protocol (FTP) to enable the transfer of content to and from the memory storage in public access folders. The data storage arrangement may also provide for either a secured log in or an anonymous login capability.

In specific embodiments, the data storage arrangement may be configured such that the system interacts with cloud storage systems. In the event that the data storage arrangement approaches the limits of storage capability, the data storage arrangement may allow for some of the data to be stored on cloud based systems. Selection of the data to be stored on such external storage systems may be governed by the controller which is configured to determine what sections of data may be appropriately stored in cloud based systems to minimize latency for users. The storage system may have a unique identifier MAC address and device name to allow the system to operate on an independent basis. The storage system may also be operated in a configuration that allows for the system to clone a MAC address of a computer that is attached.

The overall capacity of the data storage arrangement may be vary according to the different embodiments provided. Capacities 1, 2 TB up to 12 TB may be provided, as non-limiting embodiments. Different form factors may also be provided. In the illustrated embodiment, a form factor of 3.5 inches is provided. Compatibility of the data storage arrangement may be provided for Windows operating systems, Windows Server, Linux and Mac OS, as non-limiting embodiments. Example Windows operating systems that may use the system may be Windows 10, Windows 8 and Windows 7. Example Mac OS systems may be Lion (Mac OSA 10.7), Mountain Lion (Mac OS 10.8), Yosemite (Mac OS 10.10), El Capitan (Mac OS 10.11), Sierra and Mavericks as non-limiting embodiments. Supported browsers for the storage system may be, in non-limiting embodiments, Internet Explorer, Safari, Firefox and Google Chrome.

Software may also be included in the system to allow for quick and automatic backups of data according to user prescribed requirements. Such backup ability may be compliant with Windows based backup and restore functions and/or Apple Time Machine requirements. Furthermore, software may be provided to add more than one user to the storage system. Users can be added or deleted according to an administration account. Such administration account may also allow for restricted access for certain users according to administration requirements.

A broad overview of a memory storage subsystem in accordance with one embodiment is illustrated in FIG. 1. As shown, a storage subsystem 140 includes a plurality of non-volatile solid-state memory arrays 160*a*, 160*b*. The non-volatile solid-state memory arrays 160*a*, 160*b* may include any memory array commonly known in the art which provides for durable memory storage, such as non-volatile NAND flash memory. In one embodiment, the non-volatile solid-state memory arrays 160*a*, 160*b* are disposed in a collection of dies on a printed circuit board, with each die being connected to a controller 150 via a communication channel. In one embodiment, the memory within a die is arranged in a hierarchy, for example, in descending addressable size by plane, block and page, and the dies themselves are arranged into groups of one or more dies that are accessible by data channels. In some configurations, depending on the particular memory command, a block or a page is the smallest independently addressable unit of memory, though other configurations are possible. In one embodiment, the non-volatile solid-state arrays 160*a*, 160*b* receive memory commands from the controller 150, which in turn receives memory commands from a host system 130. The host system 130 includes a driver 132 in communication with the controller 150. In one embodiment, commands from the host system 130 provided to the controller 150 are stored as host commands 152 for execution on the non-volatile solid-state memory arrays 160*a*, 160*b*.

In one embodiment, the controller 150 includes a memory management subsystem 156. The memory management subsystem 156 monitors the memory commands executed on non-volatile solid-state memory arrays 160*a*, 160*b* and requests internal memory management commands 154. For example, the memory management subsystem 156 can be responsible for requesting commands for wear leveling and garbage collection operations. Wear leveling commands generally relate to averaging the number of erase operations across all blocks in a die and preventing blocks from receiving significantly uneven use. Garbage collection commands generally relate to freeing memory which is no longer being used, so that the memory is available for future write commands. A typical garbage collection command would process a unit of memory such as a block by copying valid data within the unit to new location(s) and then erasing the entire unit so that it becomes available for future write commands. Generally, it is preferable form the internal management commands of the memory storage subsystem (e.g. wear leveling and garbage collection) to operate invisibly to the host system, and to place, to the extent possible, the least amount of additional burden on host access times and throughput.

In the illustrated embodiment, the first section of memory is provided in a single level cell (SLC) configuration of a flash memory. SLC memory is provided in the first section of memory as this configuration provides faster write speeds and lower power consumption than other types of flash memory. Additionally, SLC memory has a higher endurance level, thereby having the capability of having large number of write and erase cycles. SLC memory, in the embodiment illustrated, is made of floating-gate transistors. Each cell has the capability of storing one bit of data.

The remainder of the memory in the storage device may be configured from triple level cell (TLC) configured flash memory. Triple level cell configurations allow a higher density of storage per cell compared to SLC flash memory. TLC configurations allow the ability of three (3) pieces of data to be stored per cell. TLC configurations, however, do not allow for large numbers of write and erase cycles, therefore use of TLC configurations should be tightly controlled as the excessive use of these configurations in high data exchange areas would be problematic.

Figure 2:
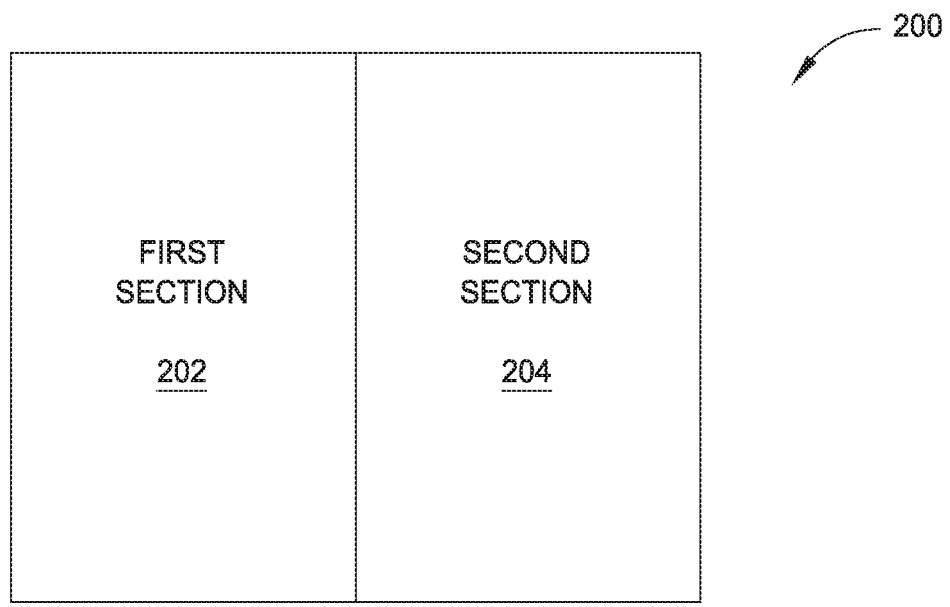
FIG. 2 is a plan view of a storage arrangement with single level cell arrangements and triple level cell arrangements in accordance with one example embodiment of the description.

In the illustrated embodiment, provided in FIG. 2, the non-volatile solid state array 160*a* and 160*b* are described in more detail, and the illustrated embodiment the arrays are a data storage arrangement is a flash memory 200. The flash memory 200 components are broken into a first section 202 and second section 204. The second section 204 has the ability to be subdivided. The first section 202 is configured from SLC memory as the first section 202 is designated by a controller to be the memory sections that accepts the most write/erase cycles as this memory is designed for such use. The first section 202 may range in size but typical sizes range from 1 to 10 Giga bytes. The first section 202 is used to enhance burst write access for benchmarks. During use of the second section 204 in conjunction with the first section 202 in the hybrid partition extension, uses of the second section 204 TLC components are counted as TLC uses.

Computer operations are variable, wherein some tasks do not require much memory capability for storage, while some tasks require more memory. It is conceivable that a computer task is received that requires greater amounts of memory for operations than those available in the first section 202. In such instances, memory from the second section 204 may be added to the first section 202 to provide a sufficient amount of memory. The second section 204 is made of TLC flash memory. The second section 204 may therefore store large amounts of data, compared to the first section 202 as the storage density is much larger. The second section 204, however, can suffer from repeated use of write/erase cycles. The second section 204 may therefore be partitioned such that a required amount of memory is to be provided to the first section 202. The amount of memory to be provided to the first section 202 is sufficient to make up the deficit required by the computer task, described above. In typical embodiments, the transferable section of the second section 204 may range from 10 to 100 Giga bytes. The second section 204 may remain as a whole unit from which any transferable section is created or a pool of memory may be created from which the transferable section may be formed.

TLC flash memory has a limit on the number of write/erase cycles before material science based defects start to occur on a regular basis. A threshold limit may be created by designers, with sufficient factor of safety, such that TLC flash memory, designated for use in a transferable section of the second section 204 does not exceed the limit on the number of write/erase cycles before material based defects occur. As a non-limiting embodiment, a threshold limit of 15 write/erase cycles may be chosen for the transferable section of the second section 204.

Every use of the transferable section of the second section 204 is counted such that the number of write/erase cycles is tracked as TLC uses. Once the number of write/erase cycles reaches the threshold limit, the transferable section of the second section 204 is transferred back to the second section 204. A new subdivision may be created from the second section 204 and then transferred to the first section 202 for use when memory requirements are not met by the first section 202.

The amount of extension of the first section 202 may be governed by the amount of memory needed to accomplish a computer task or may be a fixed amount. In one non-limiting embodiment, a 60 GB transfer may be performed.

There are specific advantages provided by the temporary triple level cell/single level cell hybrid partition extension. Having a larger first section 202 allows for superior download times for images at a corporate level for each storage device that incorporates such methods and arrangements. Download times for large file copies from external storage may also be improved by use of methods and arrangements.

The ability to create the temporary triple level cell/single level cell hybrid partition extension may be used in original equipment manufacturing image download and testing performed during production and validation testing. In another main use case, information technology images may be downloaded at the corporate IT level or files may be copied from an external device by a private user.

Figure 3:
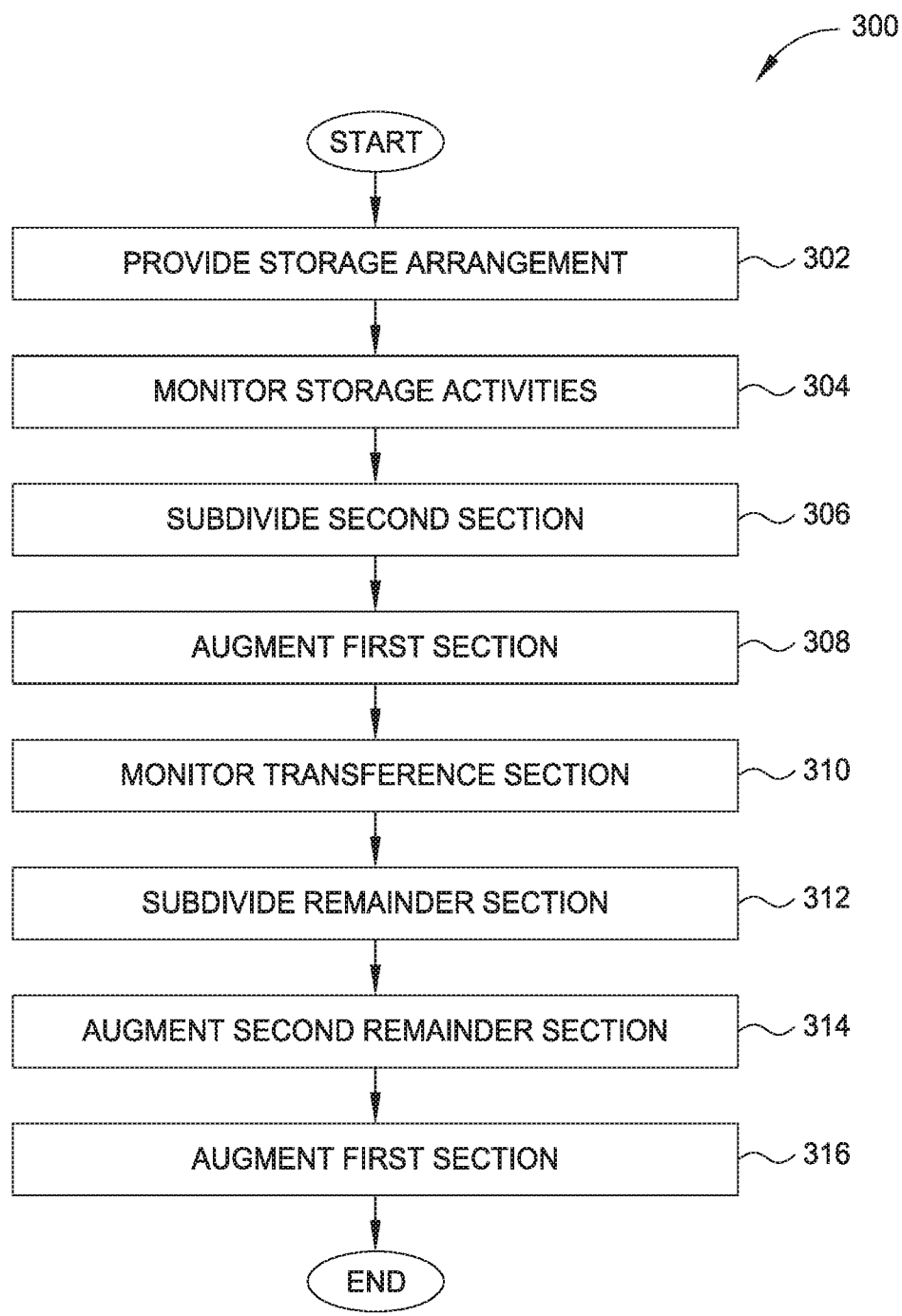
FIG. 3 is a flow chart of a method for operation of a storage arrangement in accordance with one example embodiment of the description.

Referring to FIG. 3, a method 300 for creating a temporary triple level cell/single level cell hybrid partition extension is illustrated. In 302, a data storage arrangement is provided to accept and store data. The data storage arrangement, for example, may be attached to a server, a desk computer, a laptop, a video replay device, a cellular phone, a gaming apparatus, a personal digital assistant or other similar device. The data storage arrangement is configured to have at least two sections of memory, a first section and a second section. The first section may be constructed from SLC memory units. The second section may be sub dividable into as many units as necessary. In the illustrated embodiment, the second section is separated into three sections. The second section may be constructed from TLC memory, as a non-limiting embodiment. Although listed as constructed from TLC memory, MLC memory may also be used in other embodiments. In 304, the data storage arrangement may be monitored during storage activities. During these storage activities the first section of the data storage arrangement is monitored to determine if the capacity of the first section is sufficient for computer storage needs. Such needs include burst recording needs for the storage arrangement generated by a processor controlled through user inputs. If the amount of memory is insufficient for a task, (i.e. a large write task), the storage capability of the first section may be augmented by adding storage from the second section, thereby creating a temporary triple level cell/single level cell hybrid partition extension. As provided above, if the first section is determined to be insufficient for computer storage activities, the method proceeds to 306 where the second section of memory is subdivided into a transferable section memory and a remainder section memory. The subdivision may occur from a pool created from the second section or may be created from the second section in an entirety. In 308, the first section may be augmented with the transferable section, thereby creating a hybrid partition extension. In 310, the first section may be further monitored, or the transferable section of memory may be separately monitored for use by the computing device. In 310, the transferable section of memory is monitored to track if the number of uses of the transferrable section exceeds a threshold limit. A threshold limit of 15 read/write cycles may be used as the threshold limit to limit the number of uses of the transferrable section. In an instance when the transferable section memory reaches the threshold limit, the use of the transferable section memory use may be terminated. In 312, the remainder section memory may be further subdivided into a second transferable section and a second remainder section memory. In 314, the second remainder section memory may be augmented with the original the transferable section memory. In 316 the first section may be augmented with the second transferable section memory.

The above-identified process may be repeated, as necessary, to build temporary triple level cell/single level cell hybrid partition extensions as necessary. Monitoring of the used triple level cells may take place over time to ensure that the specific tripe level cells are not repeatedly used in the creation of the hybrid partition extensions.

In one non-limiting embodiment, a method for augmenting a computing device is disclosed having steps of providing a computer storage arrangement, the computer storage arrangement having a memory having a partition of a first section and a sub dividable second section, monitoring the computing device to determine when the first section of memory requires augmentation, subdividing the second section of the memory into a transferable section memory and a remainder section memory and augmenting the first section of the memory with the transferable section.

In another non-limiting embodiment, the method may further comprise monitoring the transferable section of memory for use by the computing device.

In another non-limiting embodiment, the method may further comprise comparing the monitored use of the transferable section of memory to a threshold limit.

In another non-limiting embodiment, the method may further comprise determining use of the transferable section memory when the monitored use of the transferable section of memory reaches the threshold limit.

In another non-limiting embodiment, the method may further comprise subdividing the remainder section memory into a second transferable section and a second remainder section memory, augmenting the second remainder section memory with the transferable section memory and augmenting the first section with the second transferable section memory.

In another non-limiting embodiment, the method may further comprise comparing the monitored use of the second transferable section of memory to the threshold limit.

In another non-limiting embodiment, the method may further comprise terminating use of the transferable section memory when the monitored use of the transferable section of memory reaches the threshold limit.

In another non-limiting embodiment, the method may be accomplished wherein the threshold limit is 15 write/erase cycles.

In another non-limiting embodiment, the method may be accomplished wherein the monitoring of the computer device to determine when the first section of memory requires augmentation entails identifying a capacity of memory needed for processing data by the computer and comparing the capacity of memory needed for processing data to the first section partition.

In another non-limiting embodiment, the method may be accomplished wherein the subdividing the second section of the memory into the transferable section memory and the remainder section memory forms a transferable section memory up to 60 Gigabytes.

In another non-limiting embodiment, the method may be accomplished wherein the first section is comprised of single level cell memory arrangements and the second section is comprised of triple level cell memory arrangements.

In another non-limiting embodiment, the method may be accomplished wherein the data storage arrangement is a NAND flash unit.

In another non-limiting embodiment, the method may further comprise writing at least one set of data in the first section of memory.

In another non-limiting embodiment, the method may further comprise wear leveling the one set of data during the writing of the at least one set of data in the first section of memory.

In another non-limiting embodiment, the method may further comprise creating a pool of memory in the second section, wherein creation of transferable sections from the second section comes from the pool of memory.

In another non-limiting embodiment, an arrangement is disclosed comprising means for monitoring a computing device to determine when a first section of memory requires augmentation, means for subdividing a second section of a data storage arrangement memory into a transferable section memory and a remainder section memory and means for augmenting the first section of the memory with the transferable section memory.

In another non-limiting embodiment, the arrangement may further comprise means for monitoring the transferable section of memory for use by a computing device.

In another non-limiting embodiment, the arrangement may further comprise means for comparing the monitored use of the transferable section of memory to a threshold limit.

In another non-limiting embodiment, an arrangement is disclosed comprising a flash memory comprising a first section composed of single level cell arrangements and a second section composed to triple level cell arrangements and a controller configured to monitor storage activities in the first section of the flash memory and further configured to subdivide the second section of the flash memory to create a transferable memory section and a remainder memory section from the second section of the flash memory, the controller further configured to use the transferable memory section as an extension of the first section.

While embodiments have been described herein, those skilled in the art, having benefit of this disclosure will appreciate that other embodiments are envisioned that do not depart from the inventive scope of the present application. Accordingly, the scope of the present claims or any subsequent related claims shall not be unduly limited by the description of the embodiments described herein.

What is claimed is:

1. A method for augmenting a computing device, comprising:
   monitoring a usage of the computing device, the computer device including a data storage arrangement, the data storage arrangement comprises a partition of a first section of single level cell memory and a sub dividable second section of triple level cell memory;
   subdividing the sub dividable second section of triple level cell memory into a transferable section memory and a remainder section memory when the usage of the transferable section memory is below a threshold limit of write/erase cycles;
   augmenting the first section of single level cell memory with the transferable section;
   storing data to the augmented first section of single level cell memory in a burst recording operation;
   terminating the augmentation of the first section of single level cell memory with the transferable section when the usage of the transferable section memory reaches the threshold limit; and
   transferring the transferable section back to the sub dividable second section of triple level cell memory.

2. The method according to claim 1, wherein the threshold limit is 15 write/erase cycles.

3. The method according to claim 1, further comprising identifying a capacity of memory needed for storing data by the computer, wherein the sub dividable second section of triple level cell memory is subdivided so that the augmented first section of single level cell memory meets the capacity of memory needed for storing data to the augmented first section of single level cell memory.

4. The method according to claim 1, wherein the subdividing the second section of triple level cell memory into the transferable section memory and the remainder section memory forms the transferable section memory up to 60 Gigabytes.

5. The method according to claim 1, wherein the data storage arrangement is a NAND flash unit.

6. An arrangement, comprising:
   means for monitoring a usage of a computing device to determine when a first section of single cell memory requires augmentation;
   means for subdividing a second section of triple level memory into a transferable section memory and a remainder section memory when the usage of the transferable section memory is below a threshold limit of write/erase cycles;
   means for augmenting the first section of single cell memory with the transferable section memory;
   means for storing data to the augmented first section of single cell memory in a burst operation;
   means for terminating the augmentation of the first section of single cell memory with the transferable section memory when the usage of the transferable section memory reaches the threshold limit; and
   means for transferring the transferable section memory back to the sub dividable second section of triple level cell memory.

7. An arrangement, comprising:
   a flash memory comprising a first section composed of single level cell arrangements and a second section composed of triple level cell arrangements; and
   a controller configured to:

monitor a usage of the second section of the flash memory, subdivide the second section of the flash memory to create a transferable memory section and a remainder memory section from the second section of the flash memory, store data in a burst recording operation to the transferable memory section as an extension of the first section when a usage of the transferable memory section is below a threshold limit of write/erase cycles, terminate use of the transferable memory section as the extension of the first section when the usage of the transferable memory section reaches the threshold limit, and transfer the transferable memory section back to the second section.

8. The arrangement according to claim 7, further comprising:

a memory management subsystem configured to manage at least a portion of the flash memory.

9. The arrangement according to claim 8, wherein the memory management subsystem is configured to request commands for wear leveling and garbage collection operations.

* * * * *